April 27, 1965 W. F. ALLER 3,180,062
MACHINE TOOL SUPPORTING STRUCTURE
Filed Nov. 5, 1962 5 Sheets-Sheet 1

INVENTOR
W. F. Aller
BY Edward T. Noé Jr.
ATTORNEY

April 27, 1965 W. F. ALLER 3,180,062
MACHINE TOOL SUPPORTING STRUCTURE
Filed Nov. 5, 1962 5 Sheets-Sheet 4

INVENTOR
W. F. Aller
BY Edward J. Noig
ATTORNEY

April 27, 1965    W. F. ALLER    3,180,062
MACHINE TOOL SUPPORTING STRUCTURE
Filed Nov. 5, 1962    5 Sheets-Sheet 5
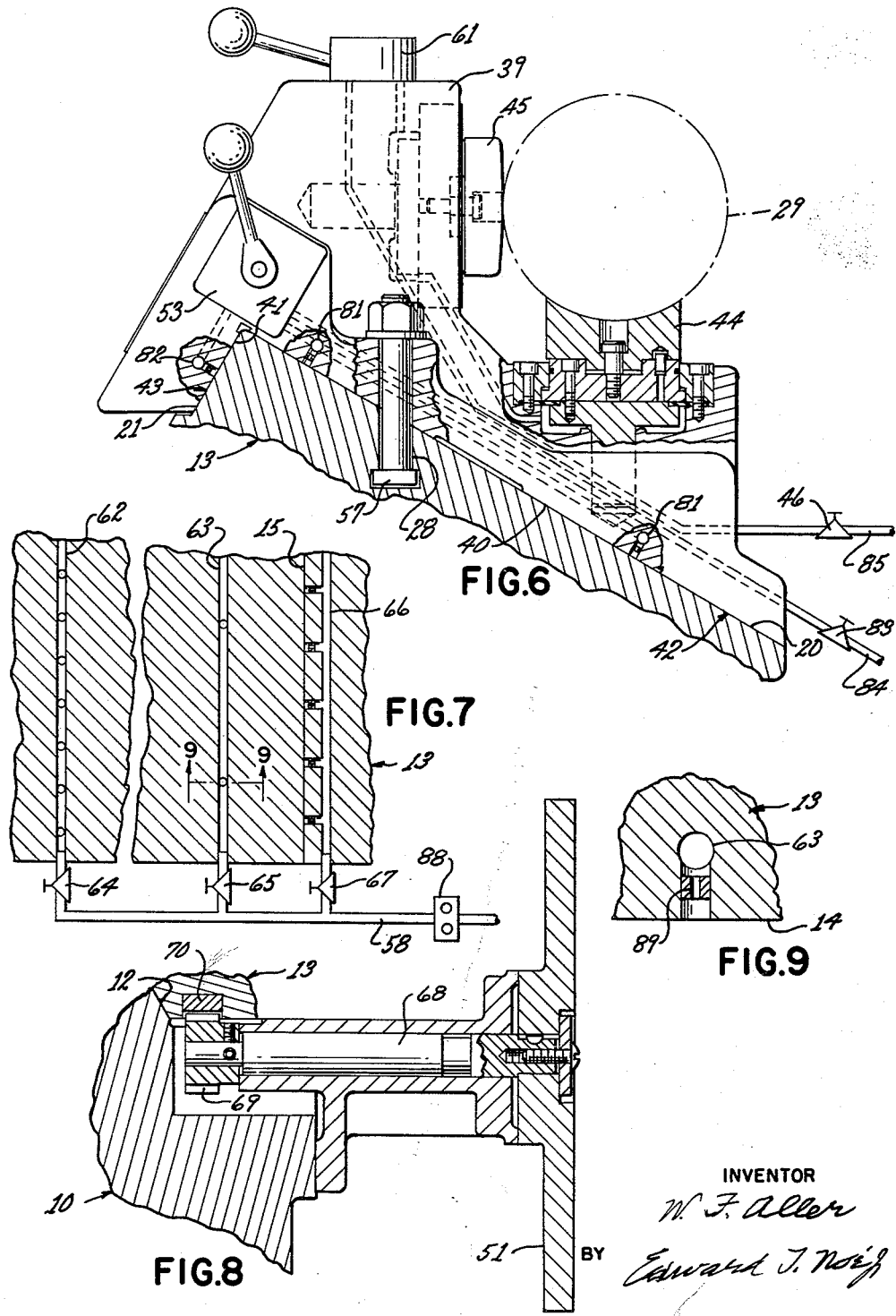

United States Patent Office 3,180,062
Patented Apr. 27, 1965

3,180,062
MACHINE TOOL SUPPORTING STRUCTURE
Willis Fay Aller, Dayton, Ohio, assignor to The Sheffield Corporation, Dayton, Ohio, a corporation of Delaware
Filed Nov. 5, 1962, Ser. No. 235,354
8 Claims. (Cl. 51—166)

This invention relates to a machine tool having an improved work supporting arrangement.

One object of the invention is the provision of a machine tool capable of supporting large heavy workpieces with a minimum effort required to set-up and operate.

Another object of the invention is the provision of a machine tool having a number of work supporting members individually supported on air bearings.

Another object of the invention is the provision of a grinding machine with a base having a supporting portion with a first inclined supporting surface and a second inclined supporting surface at an angle to the first supporting surface. A worktable is supported on said first and second supporting surfaces on individually controlled air bearings. The worktable supports a plurality of work supporting members.

Another object of the invention is to provide a tailstock which has a first supported surface and a second supported surface at an angle thereto and cooperating respectively with first and second supporting surfaces on a worktable, with air bearings between the first supported surface and its supporting surface and between the second supported surface and its supporting surface, and between the machine tool base and the worktable.

Another object of the invention is the provision of a machine tool having a base with a supporting portion supporting a worktable with an air bearing between the supporting portion and the worktable; and a tailstock and two steadyrests supported on the worktable with air bearings between the tailstock and the worktable and between each steadyrest and the worktable.

Another object of the invention is to provide a plurality of steadyrests movable in a frictionless manner on air bearings to any location along the workpiece and in which each steadyrest is provided with an adjustable fluid pressure operated work supporting member to take the weight of a workpiece and another adjustable fluid pressure operated work supporting member to take the force imposed by a work cutting means on the centers holding a workpiece.

Other objects and advantages of the invention will be apparent from the following description, the appended claims, and the accompanying drawings.

In the drawings, in which the same reference characters have been applied to like parts in several views:

FIG. 6 is a view of a steadyrest shown partly in end view and partly in cross section on the line 6—6 of FIG. 2.

FIG. 7 is a cross section on the line 7—7 of FIG. 3 schematically showing the connection to the pressure supply system.

FIG. 8 is a sectional view on the line 8—8 of FIG. 1 also showing a fragment of the worktable.

FIG. 9 is a sectional view on the line 9—9 of FIG. 7.

Figure 1:
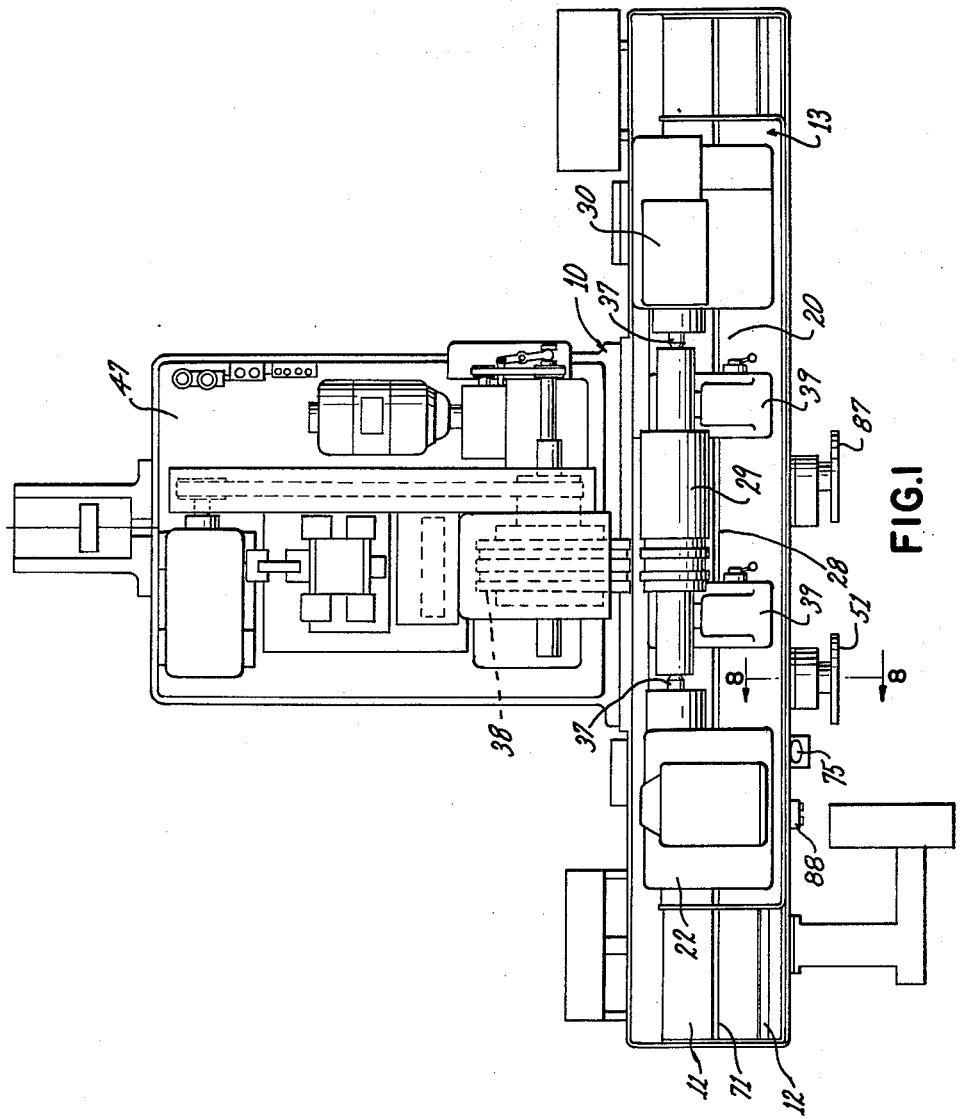
FIG. 1 shows a top view of a grinding machine embodying the present invention.

The present invention is illustrated as embodied in a cutting machine such as a grinder. The grinding machine comprises a base 10 having a supporting portion formed by two supporting surfaces 11 and 12 on the base at an angle to each other and both cooperating to support a worktable 13. The worktable 13 has two supported surfaces 14 and 15 cooperating respectively with the two supporting surfaces on the base and is adjustable thereon. The worktable 13 has a supporting portion formed by two supporting surfaces 20 and 21 at an angle to each other and adjustably carries a headstock 22 and tailstock 30 each having two supported surfaces cooperating respectively with the supporting surfaces on the worktable. The tailstock is adjustable on the worktable manually. The headstock may also be adjusted on the worktable manually if desired. Centers 37 are provided on the headstock and tailstock for supporting a workpiece 29. A cutting means shown as a grinding wheel 38 is provided and mounted on a carrier 47 which is mounted on the base 10 and movable toward the workpiece location. With the workpiece 29 mounted on the centers, the grinding wheel 38 is moved to contact the workpiece and grind a form identical to the form in the grinding wheel.

Figure 3:
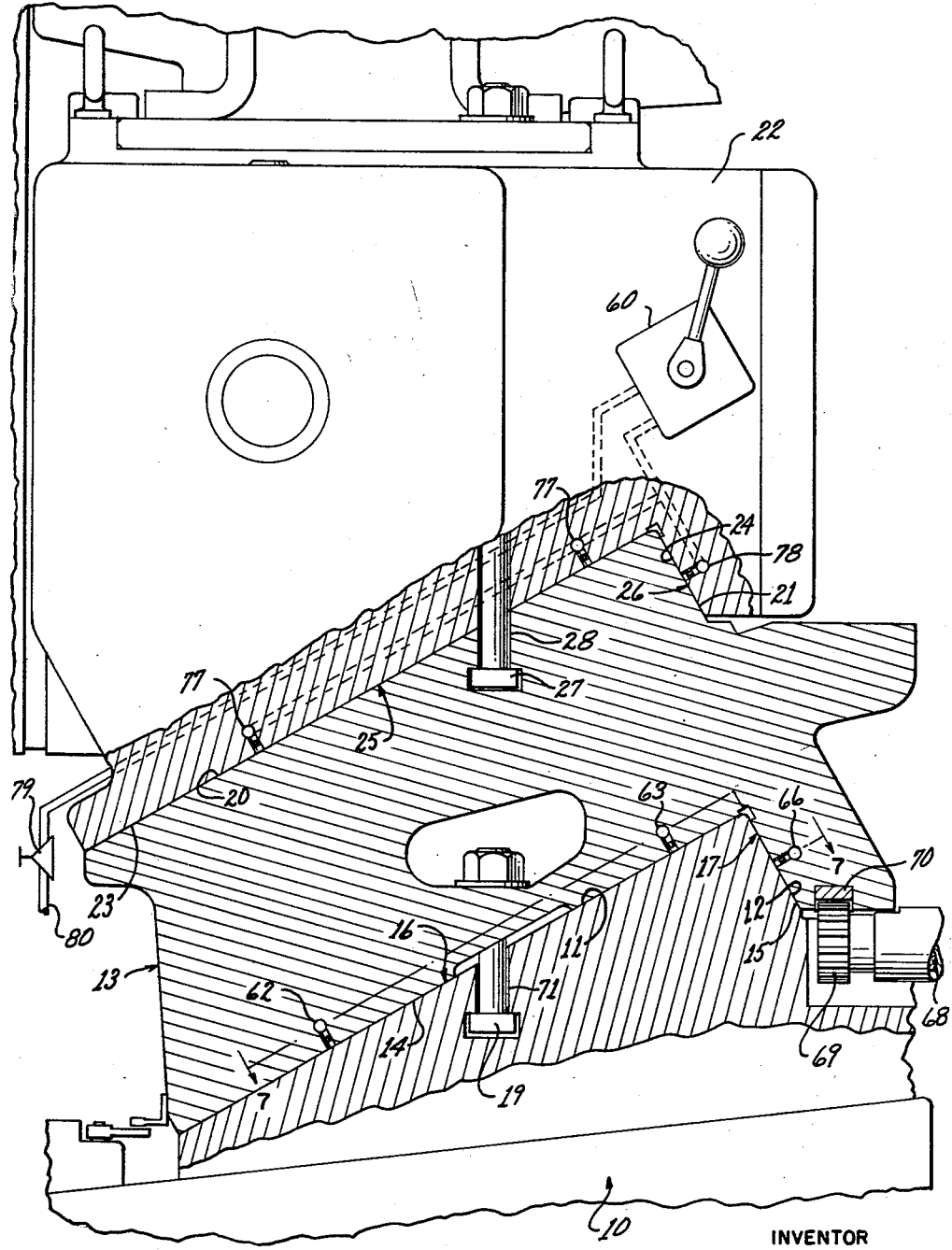
FIG. 3 is a section on the line 3—3 of FIG. 2.

The supporting portion of the base, as apparent from FIG. 3, is preferably formed by inclining the first supporting surface 11 upwardly at an acute angle from a horizontal plane and by arranging the second supported surface 12 at an angle of preferably 90 degrees to the first supporting surface. An air bearing is formed at 16 by arranging two sets 62 and 63 of air ports in the worktable to provide air between the first supporting surface 11 on the base and the first supported surface 14 on the worktable.

Each set of air ports in the worktable is comprised of a series of holes arranged along the length of the worktable and spaced apart as shown in FIG. 7. As shown, each set of air ports is provided with an independently adjustable air pressure regulator. The air ports in the first set 62 are suitably interconnected and provided with an air pressure supply controlled by an adjustable regulator 64. Air is supplied to the regulator 64 by a line 58. The air ports in the second set 63 are suitably interconnected and provided with an air pressure supply regulated by an adjustable regulator 65 and also supplied by supply line 58. Another air bearing with and independently regulated air pressure supply is formed at 17 by arranging another set 66 of air ports to provide air between the second supporting surface 12 on the base and the second supported surface 15 on the worktable. The air ports in set 66 are suitably interconnected and provided with air pressure controlled by an adjustable regulator 67 also supplied by a line 58. Because of the larger air bearing area involved, the air bearing at 16 is preferably provided with more holes than the air bearing at 17. Independent controls are provided for the three sets of air ports in the worktable so that proper air pressure can be maintained on each set to provide air bearings between the worktable and the base of substantially uniform thickness irrespective of difference in loading. Each port has a suitable restriction 89, as illustrated in FIG. 9 for set 63 of air ports in the worktable 13. The restriction cooperates with the regulated pressure level to control the thickness of the air bearing.

Figure 2:
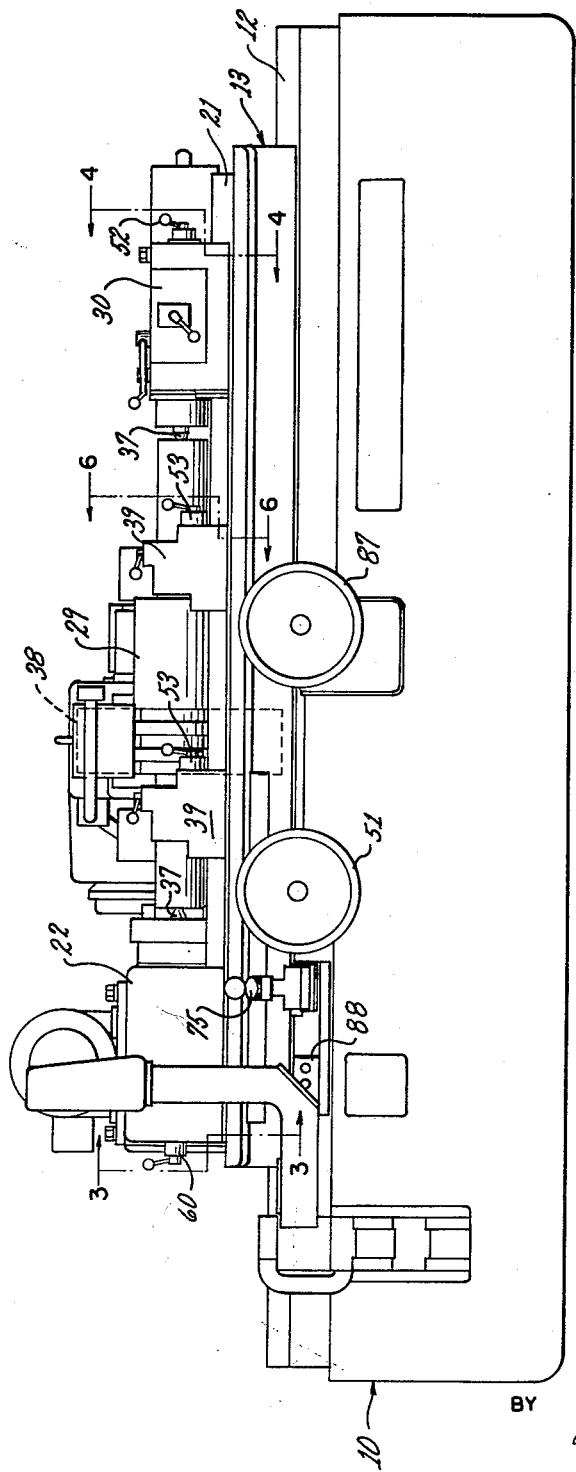
FIG. 2 is a front elevation of the grinding machine.

The air bearings between the base 10 and the worktable 13 are energized by actuating an on-off control 88, shown in FIG. 2. The worktable is then positioned along the base using a rack and pinion arrangement illustrated in FIGS. 3 and 8 by moving a handwheel 51 which is attached to a shaft 68 rotatably mounted on the base 10. The pinion 69 is attached to the shaft and engages the rack 70 on the worktable. An optical device 75 is mounted on the base and enables accurate determination of the worktable position with respect to the base. The worktable 13 can be positioned on the base within .0001 inch of a desired position by turning handwheel 51 and observing the table position on the optical device 75. Once the worktable is positioned on the base for a grinding operation, the air to the worktable air bearings is turned off and the worktable may be fastened thereon by using a suitable fastening device such as a T-bolt 19 which extends through a T-shaped slot 71 in the base.

The worktable has a supporting portion formed by a first inclined supporting surface 20 and a second inclined supporting surface 21 at an angle to the first supporting surface.

Figure 4:
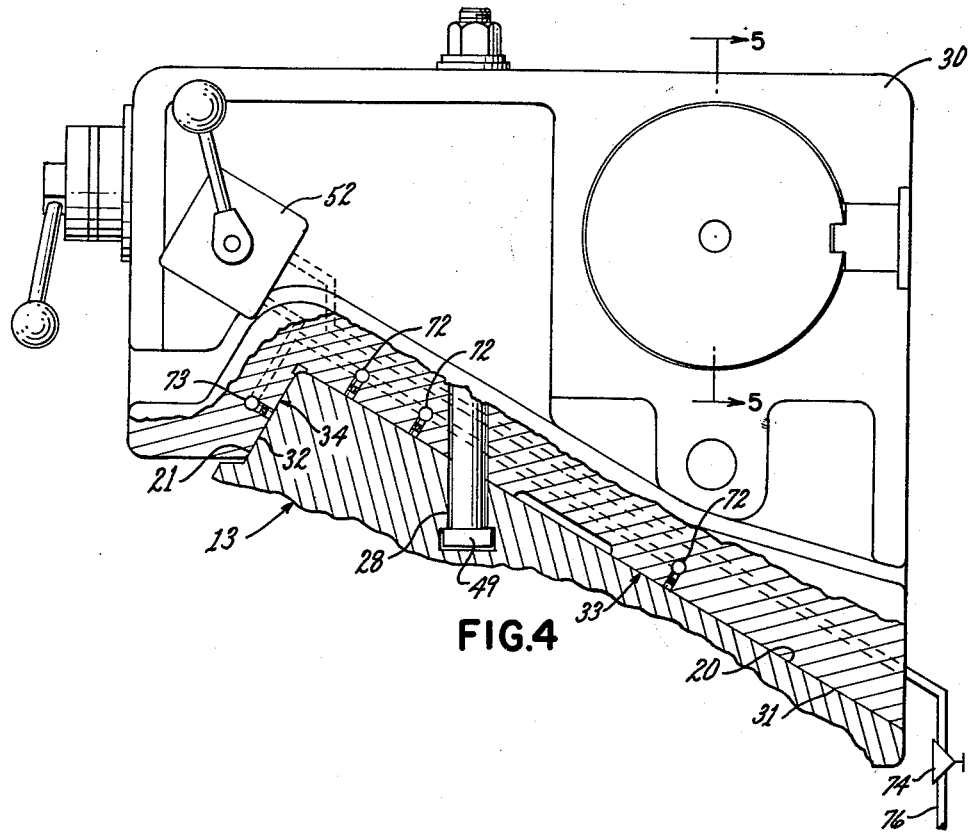
FIG. 4 is a sectional view of the tailstock and table on the line 4—4 of FIG. 2.
Figure 5:
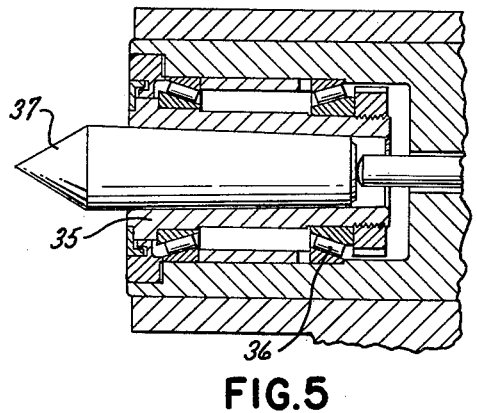
FIG. 5 is a sectional view on the line 5—5 of FIG. 4.

The worktable 13 adjustably carries the tailstock 30, as illustrated in FIG. 4, having first and second supported surfaces 31 and 32 cooperating respectively with the first and second supporting surfaces 20 and 21 on the worktable. An air bearing is formed at 33 between the first supporting surface 20 on the worktable and the first supported surface 31 on the tailstock by arranging a set 72 of interconnected air ports distributed in spaced relation along the supported surface and provided with an adjustable regulated air pressure. Another air bearing is formed at 34 between the second supporting surface 21 on the worktable and the second supported surface 32 on the tailstock by arranging another set 73 of spaced interconnected air ports and providing them with an adjustable regulated air pressure. The sets of air ports 72 and 73 are provided with regulated air pressure through an adjustable pressure regulator 74. Air is supplied to the regulator by a line 76. An on-off control 52 is used to control air flow to the tailstock air bearings. The tailstock is positioned manually and in a frictionless manner on the worktable. A suitable fastening device such as a T-bolt 49 is provided for fastening the tailstock to the worktable after it is positioned and the air to the air bearings is turned off. The T-bolt 49 travels in a T-shaped slot 28 in the worktable during positioning of the tailstock. The tailstock 30 is provided with a live center as shown in FIG. 5 formed by a rotatable member 35 attached to and cooperating with a suitable bearing, for example, a roller bearing 36. The rotatable member 35 rotatably carries one center 37 for supporting the workpiece 29.

The worktable adjustably carries a headstock 22, as illustrated in FIG. 3, having first and second supported surfaces 23 and 24 cooperating respectively with the first and second supporting surfaces 20 and 21 on the worktable. The supported surfaces 23 and 24 on the headstock are parallel respectively to the supporting surfaces 11 and 12 on the base as is preferably the case with the other air bearing supported members on the worktable. An air bearing is formed at 25 between the first supporting surface 20 on the worktable and the first supported surface 23 on the headstock by arranging a set 77 of interconnected air ports and providing them with an adjustable regulated air pressure. Another air bearing is formed at 26 between the second supporting surface 21 on the worktable and the second supported surface 24 on the headstock by arranging another set 78 of interconnected air ports and providing them with an adjustable regulated air pressure. The sets of air ports 77 and 78 are provided with regulated air pressure through an adjustable regulator 79. Air is supplied to the regulator 79 by a line 80. An on-off control 60 is used to control air flow to the headstock air bearings. The headstock is positioned manually and in a frictionless manner on the worktable. Upon turning off the air supply to the headstock air bearings, the headstock is fastened to the worktable by use of a fastening device such as a T-bolt 27 which travels in slot 28 in the worktable during adjustment of the headstock. Ordinarily the headstock is fixed to one end of the worktable; however, if it is desired to move it thereon frictionless movement is easily accomplished.

A plurality of steadyrests 39 are provided on the worktable 13. These steadyrests relieve the load imposed on the centers by the workpiece 29 and by the cutting means and thus further decrease otherwise normal wearing tendencies of the workhead mechanism and the live center tailstock bearing. The steadyrests are used to support the workpiece near the centers and/or at any point along the workpiece. A workpiece having an unusual weight distribution along its length and an unusual cross section could be operated on with greater precision by proper adjustment of the steadyrests. Each steadyrest, as illustrated in FIG. 6, has first and second supported surfaces 40 and 41 cooperating respectively with the first and second supporting surfaces 20 and 21 on the worktable.

An air bearing is formed at 42 between the first supporting surface 20 on the worktable and the first supported surface 40 on each steadyrest by arranging a set 81 of interconnected air ports and providing them with an adjustable regulated air pressure. Another air bearing is formed at 43 between the second supporting surface 21 on the worktable and the second supported surface 41 on each steadyrest by arranging another set 82 of interconnected air ports and providing them with an adjustable regulated air pressure. The sets of air ports 81 and 82 are provided with regulated air pressure through an adjustable regulator 83. Air is supplied to the regulator by a line 84. An on-off control 53 is used to control the air flow to the steadyrest air bearings. A suitable fastening device such as a T-bolt 57 is provided for fastening the steadyrest to the worktable after the steadyrest air bearings are turned off. The T-bolt 57 travels in the slot 28 during the positioning of the steadyrest. Each steadyrest 39 has a work supporting member 44 adjustably mounted on the steadyrest to take the weight of a workpiece. A second work supporting member 45 is adjustably mounted on each steadyrest to oppose the force imposed by a cutting means such as grinding wheel 38 on the centers 37. The work supporting members are readily replaceable with ones which cooperate with workpieces of different sizes and shapes. A fluid, preferably air, pressure means is provided for adjusting the work supporting members 44 and 45. The air may be supplied from an adjustable air pressure regulator 46. Air is supplied to the regulator 46 by a line 85. An on-off control 61 is provided for the air supply to the work supporting members.

In a typical operation utilizing this invention, the headstock 22 is firmly attached to one end of the worktable. The workpiece 29 is lowered into position on the worktable 13 in a suitable fashion. Air to the air bearings on the tailstock 30 is turned on by actuating the control 52. The tailstock is then manually moved in a frictionless manner so that its center 37 engages one end of the workpiece and enables the center 37 on the headstock to engage the opposite end of the workpiece. The air to the air bearings on the tailstock is then turned off and the tailstock fastened in place by tightening T-bolt 49. The air supply to the worktable air bearings is turned on by control 88 and the worktable 13 is moved in a frictionless manner on the base 10 by turning a handwheel 51. The worktable is accurately positioned with respect to the grinding wheel by observing the optical device 75 mounted on the base. The air to the worktable air bearings is then turned off and the worktable fastened in place by tightening T-bolt 19. Air is provided for the air bearings on each steadyrest 39 by actuating control 53 and each steadyrest moved in a frictionless manner and suitably positioned under the workpiece between the centers. The air to the air bearings on each steadyrest is turned off and each steadyrest is locked in place by tightening T-bolt 57. The work supporting members on each steadyrest are actuated by control 61 which supplies regulated air pressure to the first and second work supporting members 44 and 45. With the workpiece thus positioned the carrier carrying the grinding wheel 38 is moved toward the workpiece location by turning a handwheel 87. After grinding a form on the workpiece corresponding to the form on the grinding wheel, the grinding wheel is retracted and T-bolt 19 attaching the worktable is unfastened. The worktable air bearings are then turned on by control 88 and the worktable and workpiece are again accurately positioned with respect to the grinding wheel by turning handwheel 51 while observing optical device 75. The air to the worktable is then turned off and the table again fastened in place by T-bolt 19. The grinding wheel 38 is again moved toward the workpiece location by turning handwheel 87. This cycle is repeated until the required form is ground on the workpiece.

The grinding machine application of this invention illustrated in the drawings is but one of its many applications. The machine illustrated may be of great size to grind workpieces that may be several feet in length, many inches in diameter, and thousands of pounds in weight. Such workpieces in spite of their great weight may be ground with great precision in accordance with the present invention. Of course, these large workpieces require massive components to operate on them. Ordinarily it would be necessary to utilize complex systems involving devices having large mechanical advantages and capable of exerting large forces to move the worktable, tailstock, and other components. This invention by utilizing the air bearings disclosed, makes it possible to operate a huge machine with ease. Further in a grinding machine of this nature it is routine operating procedure to grind a large form in the workpiece corresponding to the form in the grinding wheel, retract the grinding wheel, reposition the worktable carrying the workpiece in relation to the grinding wheel, and grind another form at a different position along the length of the workpiece. Routinely it is necessary to reposition with great precision often of the order of tens of thousands of an inch. The air bearings and simple rack and pinion arrangement of this invention enable effortless and precision repositioning of the worktable. In addition during the grinding process, because of the generally wide grinding zones involved, great forces are exerted against the centers carrying the workpiece. The steadyrests provided by this invention effectively relieve these grinding forces as well as relieving the weight imposed by different workpieces on the centers by simply making air pressure regulator adjustments.

While the form of apparatus herein described constitutes a preferred embodiment of the invention it is to be understood that the invention is not limited to this precise form of apparatus, and that changes may be made therein without departing from the scope of the invention which is defined in the appended claims.

What is claimed is:

1. A machine tool comprising a base with a supporting portion formed by a first inclined supporting surface and a second supporting surface at an angle to the first supporting surface, a worktable with a first and second supported surface cooperating respectively with the first and second supporting surface on the base, means for providing an air bearing between the first supporting and supported surfaces, means for providing an air bearing between the second supporting and supported surfaces, said worktable having a supporting portion formed by a first inclined supporting surface and a second supporting surface at an angle to the first supporting surface, work supporting means having first and second supported surfaces cooperating respectively with the first and second supporting surfaces on the worktable, means for providing an air bearing between the first supporting surface on the worktable and the first supported surface on said work supporting means, means for providing an air bearing between the second supporting surface on the worktable and the second supported surface of said work supporting means, the first and second surfaces of each cooperating pair being of basically planar configuration and inclined relative to the horizontal, the first surface of each such pair having a substantially greater vertically projected area than that of the second, cutting means for operating on a workpiece, and a carrier for said cutting means operably mounted on said base for movement of the cutting means toward the workpiece location, said first surfaces being adjacent said cutting means and said second surfaces being remote therefrom, whereby cutting forces on a workpiece are opposed through the supporting and supported first surfaces.

2. A machine tool comprising a base with a supporting portion formed by a first inclined supporting surface and a second supporting surface at an angle to the first supporting surface, a worktable with a first and second supported surface cooperating respectively with the first and second supporting surface on the base, means for providing an air bearing between the first supporting and supported surfaces, means for providing an air bearing between the second supporting and supported surfaces, said worktable having a supporting portion formed by a first inclined supporting surface and a second supporting surface at an angle to the first supporting surface, a headstock adjustably supported on the worktable and with a first and second supported surface cooperating respectively with the first and second supporting surface on the worktable, means for providing an air bearing between the first supporting surface on the worktable and the first supported surface on the headstock, means for providing an air bearing between the second supporting surface on the worktable and the second supported surface on the headstock, a tailstock adjustably supported on the worktable and with a first and second supported surface cooperating respectively with the first and second supporting surface on the worktable, means for providing an air bearing between the first supporting surface on the worktable and the first supported surface on the tailstock, means for providing an air bearing between the second supporting surface on the worktable and the second supported surface on the tailstock, a plurality of relatively spaced steadyrests adjustably supported on the worktable and each with a first and second supported surface cooperating respectively with the first and second supporting surface on the worktable, means for providing an air bearing between the first supporting surface on the worktable and the first supported surface on each steadyrest, means for providing an air bearing between the second supporting surface on the worktable and the second supported surface on each steadyrest, the first and second surfaces of each cooperating pair being of basically planar configuration and inclined relative to the horizontal, the first surface of each such pair having a substantially greater vertically projected area than that of the second, means on the headstock and tailstock for supporting a workpiece, cutting means for operating on a workpiece, and a carrier for said cutting means operably mounted on said base for movement of the cuting means toward the workpiece location, said first surfaces being adjacent said cutting means and said second surfaces being remote therefrom, whereby cutting forces on a workpiece are opposed through the supporting and supported first surfaces.

3. A machine tool comprising a lower supporting component with a supporting portion formed by a first inclined supporting surface and a second supporting surface at an angle to the first supporting surface, an upper work supporting component with a first and second supported surface cooperating respectively with the first and second supporting surface on said lower component, means for providing an air bearing between the first supporting and supported surfaces including a regulated air pressure supply, means for providing an air bearing between the second supporting and supported surfaces including a second regulated air pressure supply, means for independently adjusting the pressure of said supplies, the first and second surfaces of each cooperating pair being of basically planar configuration and inclined relative to the horizontal, the first surface of each such pair having a substantially greater vertically projected area than that of the second, means on said upper component for supporting a workpiece, cutting means for operating on a workpiece, and a carrier for said cutting means operably mounted for movement of the cutting means toward the workpiece location, said first surfaces being adjacent said cutting means and said second surfaces being remote therefrom, whereby cutting forces on a workpiece are opposed through the supporting and supported first surfaces.

4. A machine tool comprising a base with a supporting portion formed by a first inclined supporting surface and a second supporting surface at an angle to the first supporting surface, a worktable with a first and second supported surface cooperating respectively with the first and second supporting surface on the base, means for providing an air bearing between the first supporting and supported surfaces, means for providing an air bearing between the second supporting and supported surfaces, the first and second surfaces of each cooperating pair being of basically planar configuration and inclined relative to the horizontal, the first surface of each such pair having a substantially greater vertically projected area than that of the second, a headstock supported on the worktable and movable therewith, a tailstock adjustably supported on the worktable, centers on the headstock and tailstock for supporting a workpiece, a plurality of relatively spaced steadyrests adjustably supported on the worktable, a work supporting member adjustably mounted on each steadyrest, fluid pressure means for adjusting the work supporting members, means for regulating the fluid pressure means to control the force exerted by the work on said centers, cutting means for operating on a workpiece, and a carrier for said cutting means operably mounted on said base for movement of the cutting means toward the workpiece location, said first surfaces being adjacent said cutting means and said second surfaces being remote therefrom, whereby cutting forces on a workpiece are opposed through the supporting and supported first surfaces.

5. A machine tool as set forth in claim 4 in which the work supporting member of each steadyrest is adjustable upwardly on the steadyrest to support the weight of the workpiece and each steadyrest has a second work supporting member adjustably mounted for movement toward the cutting means to oppose the force exerted by the cutting means on the workpiece.

6. A machine tool having a supporting portion formed by a first inclined supporting surface and a second supporting surface at an angle to the first supporting surface, a headstock adjustably supported on the supporting portion with a first and second supported surface cooperating respectively with the first and second supporting surface on the supporting portion, means for providing an air bearing between the first supporting surface and the first supported surface on the headstock, means for providing an air bearing between the second supporting surface and the second supported surface on the headstock, a tailstock adjustably supported on the supporting portion and with a first and second supported surface cooperating respectively with the first and second supporting surface, means for providing an air bearing between the first supporting surface and the first supported surface on the tailstock, means for providing an air bearing between the second supporting surface and the second supported surface on the tailstock, centers on the headstock and tailstock for supporting a workpiece, a plurality of relatively spaced steadyrests arranged between said centers and adjustably supported on the supporting portion and each with a first and second supported surface cooperating respectively with the first and second supporting surface, means for providing an air bearing between the first supporting surface and the first supported surface on each steadyrest, means for providing an air bearing between the second supporting surface and the second supported surface on each steadyrest, the first and second surfaces of each cooperating pair being of basically planar configuration and inclined relative to the horizontal, the first surface of each such pair having a substantially greater vertically projected area than that of the second, cutting means for operating on a workpiece, and a carrier for said cutting means operably mounted on said base for moving the cutting means toward the workpiece location, said first surfaces being adjacent said cutting means and said second surfaces being remote therefrom, whereby cutting forces on a workpiece are opposed through the supporting and supported first surfaces.

7. A machine tool comprising a base with a supporting portion formed by a first inclined supporting surface and a second inclined supporting surface at an angle to the first supporting surface, a headstock adjustably supported on the supporting portion with a first and second supported surface cooperating respectively with the first and second supporting surface, means for providing an air bearing between the first supporting and first supported surface on the headstock including a regulated air pressure supply, means for providing an air bearing between the second supporting surface and the second supported surface on the headstock including a second regulated air pressure supply, a tailstock adjustably supported on the supporting portion and with a first and second supported surface cooperating respectively with the first and second supporting surface, means for providing an air bearing between the first supporting surface and the first supported surface on the tailstock including a third regulated air pressure supply, means for providing an air bearing between the second supporting surface and the second supported surface on the tailstock including a fourth regulated air pressure supply, means for independently adjusting the pressure of said supplies, the first and second surfaces of each cooperating pair being of basically planar configuration and inclined relative to the horizontal, the first surface of each such pair having a substantially greater vertically projected area than that of the second, centers on the headstock and tailstock for supporting a workpiece, cutting means for operating on a workpiece, and a carrier for said cutting means operably mounted for movement of the cutting means toward the workpiece location, said first surfaces being adjacent said cutting means and said second surfaces being remote therefrom, whereby cutting forces on a workpiece are opposed through the supporting and supported first surfaces.

8. A machine tool comprising a base with a supporting portion formed by a first inclined supporting surface and a second inclined supporting surface at an angle to the first supporting surface, a worktable with a first and second supported surface cooperating respectively with the first and second supporting surface on the base, means for providing an air bearing between the first supporting and supported surfaces, means for providing an air bearing between the second supporting and supported surfaces, said worktable having an inclined supporting portion formed by a first inclined supporting surface and a second inclined supporting surface at an angle to the first supporting surface, a headstock supported on the worktable and movable therewith, a tailstock adjustably supported on the worktable and with a first and second supported surface cooperating respectively with the first and second supporting surface on the worktable, means for providing an air bearing between the first supporting surface on the worktable and the first supported surface on the tailstock, means for providing an air bearing between the second supporting surface on the worktable and the second supported surface on the tailstock, centers on the headstock and tailstock for supporting a workpiece, a plurality of relatively spaced steadyrests arranged between said centers and adjustably supported on the worktable and each with a first and second supported surface cooperating respectively with the first and second supporting surface on the worktable, means for providing an air bearing between the first supporting surface on the worktable and the first supported surface on each steadyrest, means for providing an air bearing between the second supporting surface on the worktable and the second supported surface on each steadyrest, the first and second surfaces of each cooperating pair being of basically planar configuration and inclined relative to the horizontal, the first surface of each such pair having a substantially greater vertically projected area than that of the second, a work supporting member on each steadyrest adjustable upwardly on the steadyrest to support the weight of the workpiece, a second work supporting member on each steadyrest adjustably mounted for movement toward the cutting means to oppose the force exerted by the cutting means on the workpiece, fluid pressure means for adjusting the work supporting members, means for regulating the fluid pressure means, cutting means for operating on a workpiece, and a carrier for said cutting means operably mounted on said base for movement of the cutting means toward the workpiece location, said first surfaces being adjacent said cutting means and said second surfaces being remote therefrom, whereby cutting forces on a workpiece are opposed through the supporting and supported first surfaces.

References Cited by the Examiner

UNITED STATES PATENTS

| | | | |
|---|---|---|---|
| 544,439 | 8/95 | Landis | 51—51 |
| 1,897,035 | 2/33 | Anderson | 51—166.7 |
| 2,101,790 | 12/37 | Cole et al. | 51—237 X |
| 2,132,924 | 10/38 | Belden | 51—232 |
| 2,170,606 | 8/39 | Flygare | 51—237 |
| 2,378,343 | 6/45 | Walter | 51—240 |
| 2,411,391 | 11/46 | Robaczynski | 51—240 |
| 2,520,129 | 8/50 | Dall et al. | 51—95.1 X |
| 2,521,030 | 9/50 | Wilson | 77—62 |
| 2,869,933 | 1/59 | Bissinger | 308—5 |
| 2,942,385 | 6/60 | Pal | 51—166 |
| 2,985,988 | 5/61 | Johnson et al. | 51—166 X |

FOREIGN PATENTS

| | | |
|---|---|---|
| 702,584 | 1/54 | Great Britain. |
| 802,155 | 10/58 | Great Britain. |

LESTER M. SWINGLE, *Primary Examiner.*

JOHN C. CHRISTIE, *Examiner.*